United States Patent Office 3,538,109
Patented Nov. 3, 1970

3,538,109
2-BENZOTHIAZOLINETHIONES
Adel F. Halasa, Akron, Ohio, assignor to The Firestone Tire & Rubber Company, Akron, Ohio, a corporation of Ohio
No Drawing. Continuation-in-part of applications Ser. No. 473,498, and Ser. No. 473,501, July 20, 1965. This application July 25, 1967, Ser. No. 655,761
Int. Cl. C07d 91/18
U.S. Cl. 260—306.7         4 Claims

ABSTRACT OF THE DISCLOSURE

3-substituted 2-benzothiazolinethiones are made by reacting benzothiazoline-2-thione with a member of the class consisting of acrylic acid and derivatives thereof and certain olefins, keteones and nitroolefins.

This application is a continuation-in-part of my applications Ser. No. 473,498 and Ser. No. 473,501 filed July 20, 1965 (both abandoned).

This invention relates to 3-substituted 2-benzothiazolinethiones represented by the formula

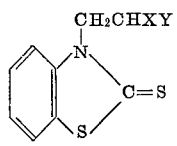

when X is hydrogen or a nitro group, Y is derived from reactants which contain an activated vinyl group in which reactants Y is connected to that vinyl group. Benzothiazoline-2-thione (often called 2-mercapto-benzothiazole) is reacted with reactants from the class consisting of:

(1) Olefins having the formula $CH_2=CHY$ in which Y is a hydrocarbon aromatic radical (e.g. phenyl, naphthyl, alkyl phenyl or naphthyl in which the alkyl substitution contains 1 to 4 carbon atoms, etc.). The following olefins are illustrative:

1- and 2-vinylnaphthalene
styrene
alpha-methylstyrene
1-methyl-2-vinylnaphthalene (2) Olefins having the formula $CH_2=CHY$ in which Y is an unsaturated-heterocyclic radical. The following olefins are illustrative:

2- and 4-vinylpyridine and substituted vinylpyridines
2- and 3-vinylthiophene
2- and 3-vinylpyrrole
2- and 4-vinylquinoline
2- and 3-vinylfuran
2-vinylbenzothiazole
2- and 3-vinyloxazine
2-vinyltriazine
2-, 4- and 5-vinyloxazole
2- and 4-vinylimidazole (3) Ketones having the formula

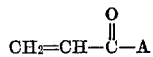

in which

is Y, where A is from the class consisting of aryl groups (including phenyl, naphtyl, alkylphenyl, etc.), of which the following ketones are illustrative:

phenyl vinyl ketone
p-tolyl vinyl ketone
4,4'-biphenyl vinyl ketone
naphthyl vinyl ketone (4) Acrylic acid and derivatives having the formula

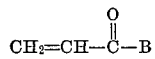

in which $$-\overset{O}{\underset{\|}{C}}-B$$

is Y, where B is from the class consisting of —OH, —NH$_2$, —NHR and —NR$_2$ (where each R is an alkyl group of 1 to 4 carbon atoms), and —OR' (where R' is an alkyl group of 1 to 4 carbon atoms); of which the following reactants are illustrative:

acrylic acid
methyl acrylate
acrylamide
N-isopropylacrylamide
N,N-diethylacrylamide
and includes other alkyl acrylates and acrylamides in which the alkyl group contains 1 to 12 carbon atoms.

(5) Nitroolefins having the formula $CH_2=CYNO_2$ in which Y is from the class consisting of hydrogen and alkyl groups of 1 to 12 carbon atoms and aryl groups (e.g. phenyl, naphthyl, alkylphenyl, etc.); of which the following are illustrative:

nitroethylene
2-nitro-1-propene
2-nitro-1-butene
alpha-nitrostyrene
1-nitro-1-cyclohexylethene
2-nitro-1-octene
2-nitro-3,4,4-trimethyl-1-pentene and homologous nitroalkylenes (straight chain, branched chain and cycloalkenes) containing 1 to 12 carbon atoms.

"Alkyl" as used in the foregoing includes straight chain, branched chain and cyclic alkyl groups.

The compounds have the formula

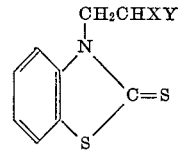

in which Y is a radical by which a vinyl group when coupled thereto is activated, which radical, when X is hydrogen, is selected from the class consisting of the following:

(a) A hydrocarbon aromatic radical,
(b) An unsaturated heterocyclic radical, and
(c) A radical having the formula

where Z is from the class consisting of aryl radicals, —NH$_2$, —NHR and —NR$_2$ in which each R is an alkyl radical of 1 to 4 carbon atoms, alkoxy radicals in which the alkyl radical contains 1 to 4 carbon atoms, and —OH
and which class, when X is —NO$_2$, consists of alkyl radicals of 1 to 12 carbon atoms and aryl radicals.

These compounds are all delayed-action rubber accelerators. They may be produced by Michael additions to benzothiazoline-2-thione (commonly called mercaptobenzothiazole or MBT), using a compound containing an activated olefin group. Other methods may be used for producing them. One would normally expect the products from such Michael addition reactions to give an S-substituted adduct. Surprisingly, the adducts are not the expected sulfur-substituted adducts, but are nitrogen-substituted adducts.

A study of the situation leads to the conclusion that the substitution on the nitrogen atom instead of the sulfur atom is due to the fact that the unstable nitrogen anion adds faster than the stable sulfur anion. The sulfur adduct in the presence of base reverses into the reactant which, in turn, produces the more stable nitrogen adduct. In other words, the unexpected preference for the N-substituted Michael adduct can be explained as the result of equilibria between the sulfur and nitrogen anions and the corresponding Michael adducts. According to these equilibria the sulfur anion of benzothiazole-2-thiol being the most stable and least energetic anion is favored in the reverse Michael reaction. The nitrogen anion being less stable and more energetic favors the forward Michael reaction; thus pulling the equilibria in that direction. The end result is the formation of the nitrogen adduct, which is the most stable end product.

The following examples are illustrative:

EXAMPLE I

3(2-(4-pyridyl)ethyl)-2-benzothiazolinethione

Reactants used:
   4-vinylpyridine (0.20 mole)—20 g.
   Benzothiazoline-2-thione (0.10 mole)—17 g.
   NaH (50% suspension in oil)—0.1 g.
   Tetrahydrofuran—200 ml.

A solution of 17 g. of MBT in 200 ml. of freshly distilled tetrahydrofuran was made in a 3-necked flask containing a stirrer and thermometer. To this there was added 20 g. of 4-vinylpyridine, and then 0.1 g. of sodium hydride. The temperature was adjusted to 40–45° C., and the reaction mixture was stirred for about 48 hours. The mixture was added to cold water and the solid collected was recrystallized from a mixture of 5 parts of iso-propyl ether and 1 part $CHCl_3$. This product, 3(2-(4-pyridyl)ethyl)-2-benzothiazolinethione, melted at 159–161° C.

Analysis.—Calcd. for $C_{14}H_{12}N_2S_2$ (percent): C, 61.81; H, 4.44; N, 10.29; S, 23.23. Found (percent): C, 61.50; H, 4.25; N, 10.20; S, 23.24.

The compound has the formula

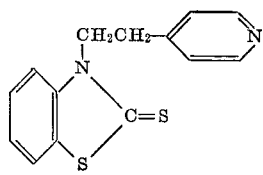

EXAMPLE II

3(2-(2-pyridyl)ethyl)-2-benzothiazolinethione

The procedure was comparable to that of Example I, using 2-vinylpyridine instead of 4-vinylpyridine. The product, 3(2-(2-pyridyl)ethyl)-2-benzothiazolinethione, after recrystallization from ethanol had a melting point of 94–95° C.

Analysis.—Calcd. for $C_{14}H_{12}N_2S_2$ (percent): C, 61.81; H, 4.44; N, 10.29; S, 23.23. Found (percent): C, 61.69; H, 4.35; N, 10.0; S, 23.40.

The infrared spectrum had bands at 6.10μ (C=C), 7.30μ (thione), 13.20μ and 14.20μ (aromatic). The structure was also confirmed by Nuclear Magnetic Resonance Spectral Data.

The compound has the formula

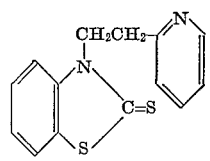

EXAMPLE III 3-(2-nitrobutyl)-2-benzothiazolinethione

Reactants used:
   2-nitrobutyl acetate (0.05 mole)—8.05 g.
   Benzothiazoline-2-thione (0.05 mole)—8.35 g.
   NaH (50% suspension in oil)—1.2 g.
   Absolute alcohol—200 ml.

To a 500-ml., 3-necked flask equipped with stirrer, thermometer, and a water condenser was added a cooled (0–5° C.) solution of 8.05 g. of MBT and an equivalent amount of sodium hydride. The solution was stirred in an ice bath until a constant temperature of 0° C. was attained. Then the nitrobutyl acetate was added. The 2-nitrobutene-1 is formed in situ from the 2-nitro-butyl acetate. The reaction was then heated to 40° C. and allowed to stir for 48 hours. The reaction mixture was then acidified with dilute acetic acid. A solid precipitated which was identified as 3-(2-nitrobutyl)-2-benzothiazolinethione. It has the formula

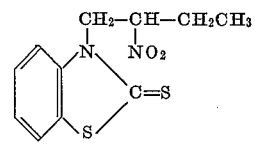

On recrystallization from chloroform and petroleum ether it had a melting point of 89–90° C. The infrared spectrum as well as the elemental analysis were in agreement with the above structure.

Analysis.—Calcd. for $C_{11}H_{12}N_2O_2S_2$ (percent): C, 49.23; H, 4.51; N, 10.44; S, 23.89. Found (percent): C, 48.80; H, 4.72; N, 9.34; S, 23.66.

EXAMPLE IV

3(2-benzoylethyl)-2-benzothiazolinethione

Reactants used:

Beta-chloropropiophenone (0.06 mole)—10 g.
   Benzothiazoline-2-thione (0.06 mole)—10.02 g.
   NaH (50% suspension in oil)—168 g.
   Absolute alcohol—100 ml.

A solution of the MBT in the alcohol was contained in a reaction vessel and the sodium hydride was added. The resulting solution of the sodium salt of MBT was cooled to 0–5° C., and then the beta-chloropropiophenone was added dropwise over a period of 30 minutes. Vinylphenyl ketone was formed in situ in the reaction mixture. The reaction mixture was warmed to 40–45° C. and allowed to stir at this temperature for 24 hours. On filtration, a yellow product was obtained which on recrystallization from chloroform/ethanol melted at 144.5 to 145° C. The structure of the resulting product was determined by its elemental analysis as well as its infrared spectrum to be 3(2-benzoylethyl)-2-benzothiazolinethione with the formula

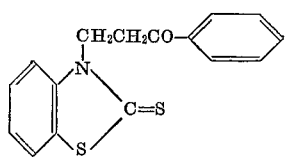

Analysis.—Calcd. for $C_{16}H_{13}NOS_2$ (percent): C, 64.21; H, 4.35; N, 4.68; S, 21.40. Found (percent): C, 64.22; H, 4.39; N, 4.70; S, 21.59.

What I claim is:
1. The compound 3(2-nitroalkyl)-2-benzothiazolinethione in which the alkyl group contains 1 to 12 carbon atoms.
2. The compound 3(2-benzoylalkyl)-2-benzothiazolinethione in which the alkyl group contains 1 to 12 carbon atoms.
3. The compound 3(2-nitrobutyl)-2-benzothiazolinethione.
4. The compound 3(2-benzoylethyl)-2-benzothiazolinethione.

References Cited

Postovskii et al., Khim. Geterotsikl. Soedinenii, vol. 1, No. 4, pp. 621–624, 1965.

ALAN L. ROTMAN, Primary Examiner

U.S. Cl. X.R.

260—248, 294.8, 306, 785, 786

PO-1050
(5/69)

UNITED STATES PATENT OFFICE
CERTIFICATE OF CORRECTION

Patent No. 3,538,109     Dated November 3, 1970

Inventor(s) Adel F. Halasa

It is certified that error appears in the above-identified patent and that said Letters Patent are hereby corrected as shown below:

Col. 4, line 49, "168 g." should read --1.68 g.--

Col. 1, line 17, "keteones" should read --ketones--

SIGNED AND
SEALED
MAR 9 1971

(SEAL)
Attest:

Edward M. Fletcher, Jr.
Attesting Officer

WILLIAM E. SCHUYLER, JR.
Commissioner of Patents